(12) United States Patent
Cordier

(10) Patent No.: US 7,850,181 B2
(45) Date of Patent: Dec. 14, 2010

(54) INDEPENDENT SUSPENSION WITH ADJUSTABLE SUB-FRAME

(75) Inventor: Gerard Cordier, Andrezieux-Boutheon (FR)

(73) Assignee: Axletech International IP Holdings, LLC, Troy, MI (US)

( * ) Notice: Subject to any disclaimer, the term of this patent is extended or adjusted under 35 U.S.C. 154(b) by 524 days.

(21) Appl. No.: 11/662,823

(22) PCT Filed: Sep. 23, 2004

(86) PCT No.: PCT/US2004/031119

§ 371 (c)(1),
(2), (4) Date: May 2, 2008

(87) PCT Pub. No.: WO2006/041441

PCT Pub. Date: Apr. 20, 2006

(65) Prior Publication Data

US 2008/0258417 A1 Oct. 23, 2008

(51) Int. Cl.
*B60G 7/02* (2006.01)

(52) U.S. Cl. ............................................. 280/124.109

(58) Field of Classification Search ................ 180/312, 180/360, 380; 280/124.109, 124.136, 788
See application file for complete search history.

(56) References Cited

U.S. PATENT DOCUMENTS

| | | | |
|---|---|---|---|
| 3,243,007 A | 3/1966 | Berckhan | |
| 5,185,543 A | 2/1993 | Tebbe | |
| 5,820,150 A | 10/1998 | Archer et al. | |
| 5,833,026 A * | 11/1998 | Zetterstrom et al. | 180/360 |
| 6,470,991 B1 | 10/2002 | Bowman et al. | |
| 6,516,914 B1 | 2/2003 | Andersen et al. | |
| 6,520,494 B1 * | 2/2003 | Andersen et al. | 267/273 |
| 6,752,235 B1 * | 6/2004 | Bell et al. | 180/360 |
| 6,764,085 B1 * | 7/2004 | Anderson | 280/124.134 |
| 2009/0029821 A1 * | 1/2009 | Martin et al. | 475/231 |

* cited by examiner

*Primary Examiner*—Faye M. Fleming
(74) *Attorney, Agent, or Firm*—Howard & Howard Attorneys PLLC

(57) ABSTRACT

A carrier housing for receiving a drive shaft that is drivingly coupled to a drive axle is provided, where the carrier housing is also connected to a sub-frame. To provide an adjustable relationship between the carrier housing and the sub-frame, the carrier housing further comprises a cover gear that may be removably coupled to a ring gear, which is attached to the sub-frame. By removing either the cover gear or the ring gear, the carrier housing may be repositioned with respect to the sub-frame.

8 Claims, 5 Drawing Sheets

INDEPENDENT SUSPENSION WITH ADJUSTABLE SUB-FRAME

BACKGROUND OF THE INVENTION

This invention relates generally to independent suspensions, and more particularly, to independent suspensions having a rotatable carrier.

A common problem with motorized vehicles is that transfer of the motive force from the engine to the driven axle via the drive train produces vibration and noise in the vehicle. Many designs have been developed to reduce vibration and noise levels of vehicles. For example, in U.S. Pat. No. 5,185,543 to Tebbe, a tortional vibration damper is coupled to a motor vehicle drive train, which changes the natural frequency of the drive train, making it less subject to vibration. While these designs have improved the vibration and noise levels for vehicles, a continual need exists for novel approaches to further minimize these problems.

SUMMARY OF THE INVENTION

A carrier housing for receiving a drive shaft that is drivingly coupled to a drive axle is provided, where the carrier housing is also connected to a sub-frame. To provide an adjustable relationship between the carrier housing and the sub-frame, the carrier housing further comprises a cover gear that may be removably coupled to a ring gear, which is attached to the sub-frame. By removing either the cover gear or the ring gear, the carrier housing may be re-positioned with respect to the sub-frame.

A better understanding of the objects, advantages, features, properties and relationships of the invention will be obtained from the following detailed description and accompanying drawings, which set forth illustrative embodiments that are indicative of the various ways in which the principles of the invention may be employed.

BRIEF DESCRIPTION OF THE DRAWINGS

For a better understanding of the invention, reference may be had to preferred embodiments shown in the following drawings in which.

DETAILED DESCRIPTION

Figure 1:
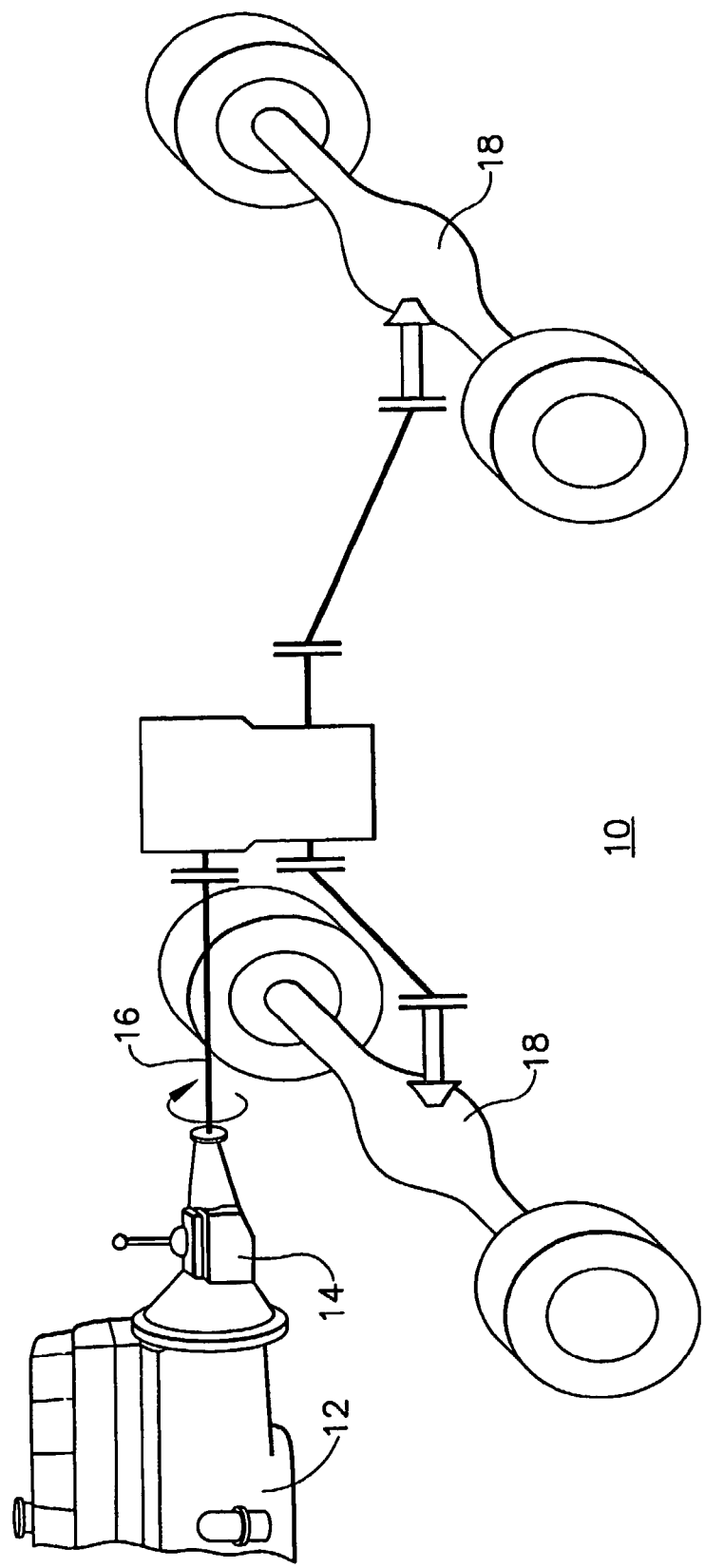
FIG. 1 illustrates a schematic view of a typical vehicle driveline.

Turning now to the figures, wherein like reference numerals refer to like elements, there is illustrated an independent suspension with a rotatable carrier housing. FIG. 1 shows a schematic view of a typical vehicle driveline 10 for a motorized vehicle. More particularly, the driveline 10 includes an engine 12 coupled to a transmission 14, which together provide driving input torque to a drive shaft 16 that is drivingly coupled to a drive axle 18. Although drive axle 18 is shown as a single drive axle, drive axle 18 may also form part of a tandem drive axle and the vehicle may also include one or more non-driving axles, such as non-drive steer axles or trailer axles. Moreover, drive axle 18 may also be steerable or non-steerable. Therefore, it should be understood that the present invention may be used in connection with various different types of vehicle axles without departing from the teachings and tenets provided herein.

Figure 2:
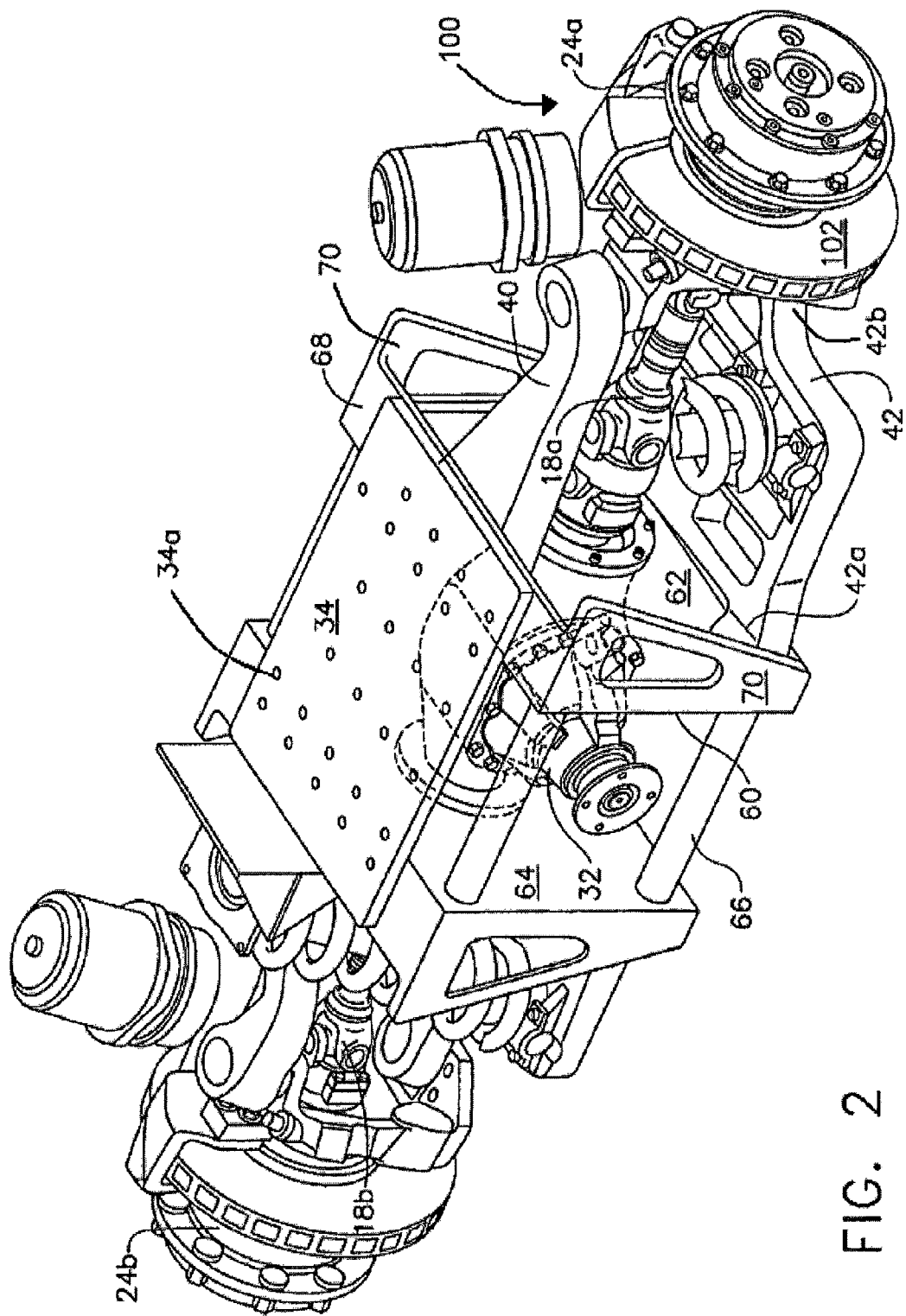
FIG. 2 illustrates a perspective view of drive axle and independent suspension assembly that uses splines to secure the carrier to a sub-frame with a portion of the spring unit cut away for clarity.

As shown in FIG. 2, each drive axle 18 includes a wheel end assembly 24a, 24b on each end of the drive axle 18. It should be appreciated by those with skill in the art, however, that dual wheels may also be included on each end of the drive axle to increase the load bearing capability for the vehicle. Moreover, it is also possible for drive axle 18 to be comprised of a pair of independent drive axles 18a, 18b, where each of the independent drive axles are associated with a wheel end assembly located on opposed sides of the vehicle.

Figure 3:
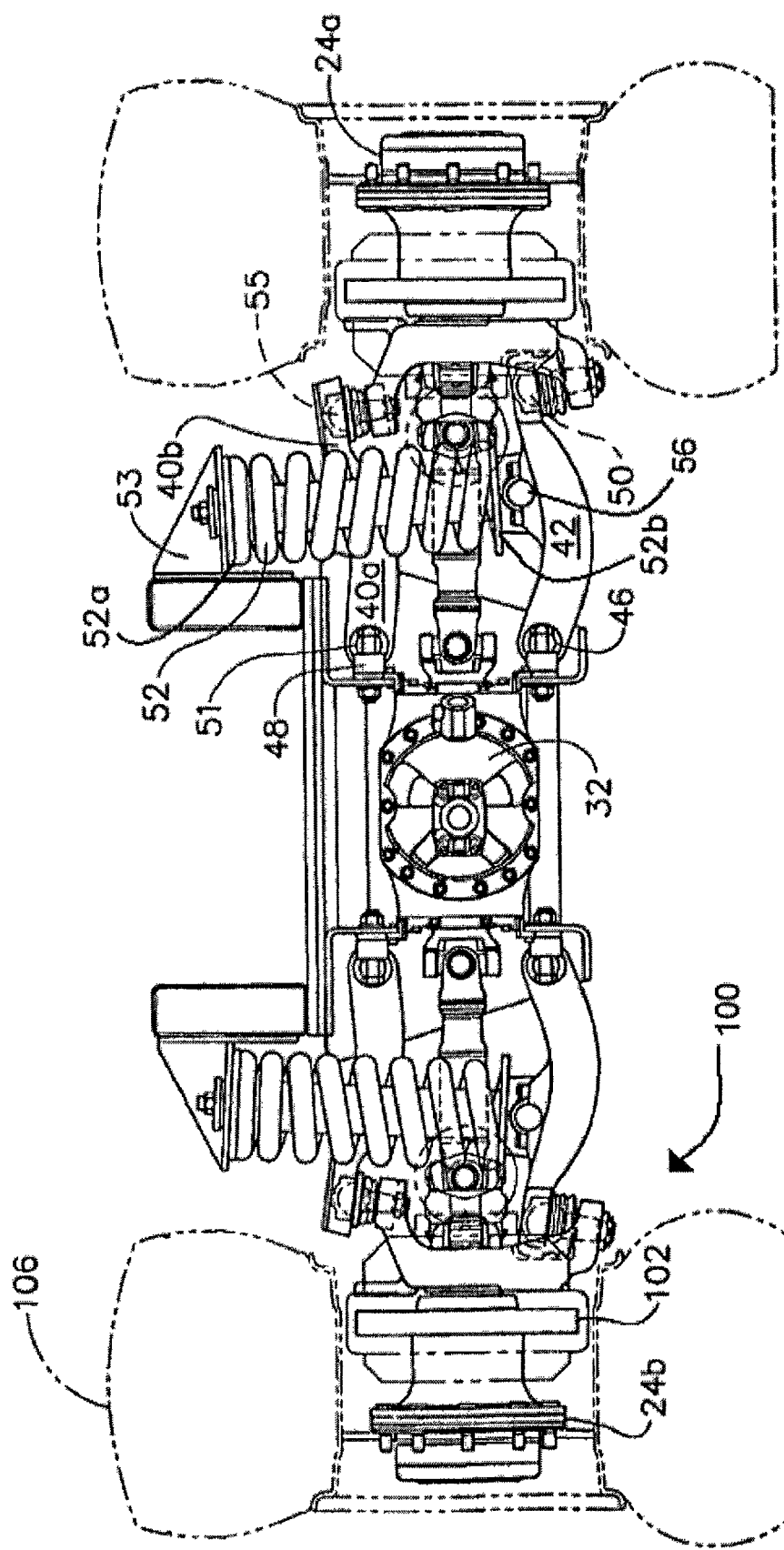
FIG. 3 illustrates a rear view of an independent suspension, including a rotatable carrier connected to a driveshaft and a differential unit.
Figure 4:
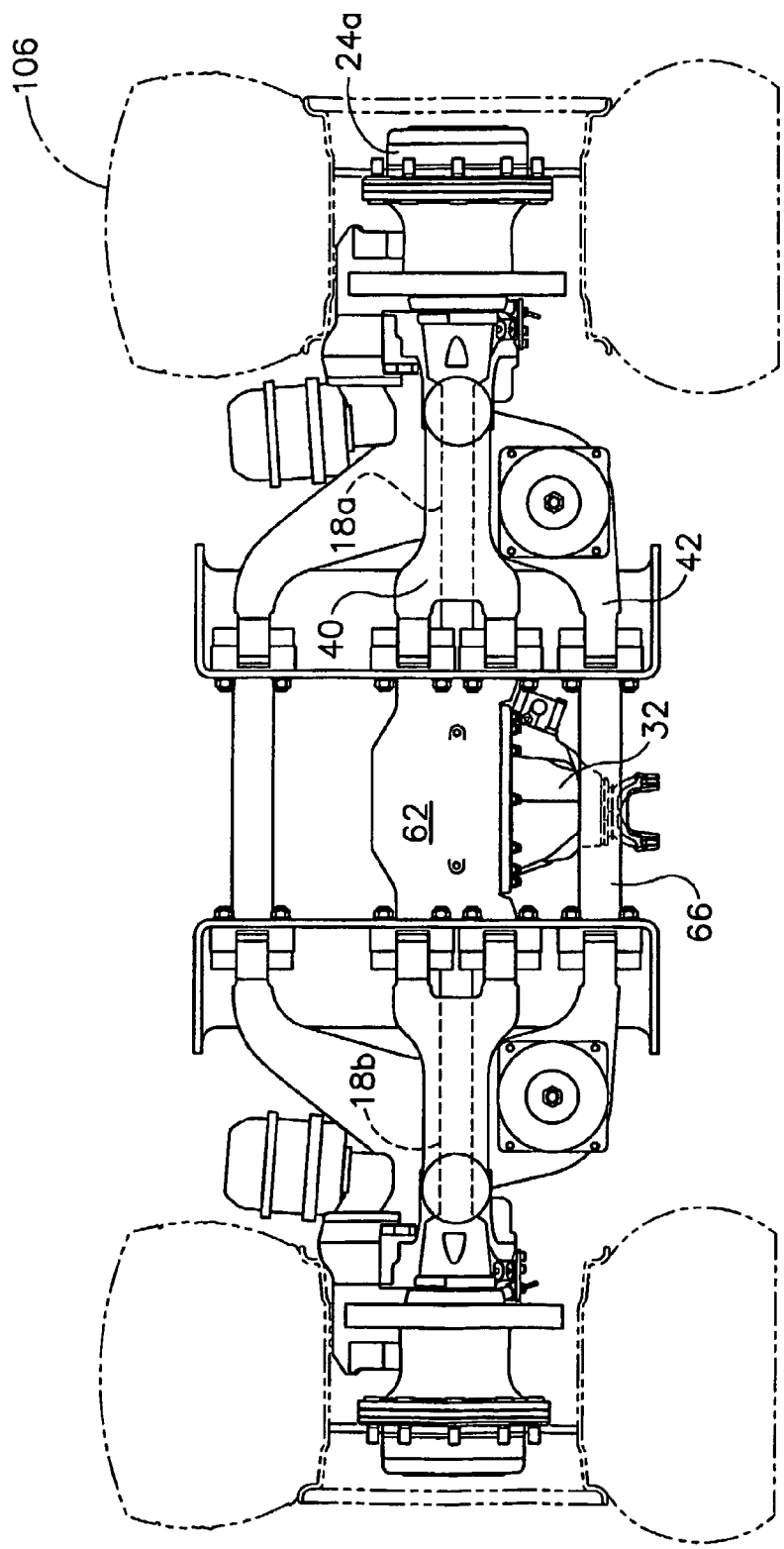
FIG. 4 illustrates a top view of the independent suspension shown in FIG. 3.

For allowing each of the wheel end assemblies 24a, 24b to rotate at different speeds, a differential assembly 62 may be provided. The differential assembly 62 may also act to drivingly attach drive shaft 16 and drive axles 18a, 18b. The gearing connecting drive shaft 16 to differential assembly 62 and differential assembly 62 to drive axles 18a, 18b is known in the industry and various differential assemblies 62 may be used, such as a limited-slip differential, a No-Spin® differential, or a Torsen®0 differential. Differential assembly 62 is housed within carrier housing 32 and drive axles 18a, 18b may also be coupled to carrier housing 32. Moreover, as shown in FIGS. 3 and 4, each of the independent drive axles 18a, 18b may also be coupled to carrier housing 32.

To support carrier housing 32, upper and lower control arms (described in detail below) and the drive axles 18a, 18b associated therewith, a sub-frame 60 may be attached to vehicle chassis. While it is preferred that sub-frame 60 is attached to vehicle chassis by using a plate 34 (as shown in FIG. 2), which includes pre-drilled holes 34a for securing sub-frame 60 to plate 34 and vehicle chassis, sub-frame 60 may also include brackets or other means for securing it to the vehicle chassis.

The sub-frame 60 is further comprised of a first side wall 62 and a second side wall 64 with torsion bars 66 extending between the first and second side walls 62, 64. To further strengthen the structural integrity of sub-frame 60, an outer frame 68 may also be provided. As shown in FIG. 2, outer frame 68 may extend from the outer periphery of and perpendicularly to each of the side walls 62, 64. In addition, for further strengthening of sub-frame 60, support members 70 may also be provided. In the preferred embodiment of the present invention, support members 70 extend parallel to the drive axles 18a, 18b and perpendicularly to plate 34. Support members 70 may be formed integral with sub-frame 60 or separately. It should be appreciated, however, that other arrangements and designs of support members 70 may also be employed without departing from the scope of this invention. To allow drive axles 18a, 18b to be coupled to wheel assemblies 24a, 24b, side walls 62 and 64 may each include an aperture 62a, 64a. Each of the apertures 62a, 64a may also be sized to receive a cover gear 80, which may be attached to carrier housing 32 and which may be located within the apertures 62a, 64a.

For supporting the wheel assemblies 24a, 24b attached to the respective ends of drive axles 18a, 18b, an upper control arm 40 and a lower control arm 42 are provided. Since the wheel assemblies 24a, 24b are mirror images of each other, only the suspension components connecting wheel assembly 24a to the drive axle 18a will be described. As shown in FIG. 2, the lower control arm 42 may form a modified wishbone and has a first side 42a and a second side 42b. The first side 42a of lower control arm 42 includes a joint 46 that pivotally attaches lower control arm 42 to support member 70, which extends from sub-frame 60. Although joint 46 is preferably a universal joint, it may also be a shaft and bushing assembly, or bearings. In addition, it should be understood that other mechanisms may also be used to pivotally attach the first side 42a of lower control arm 42 to support member 70. It should also be understood that there may be more than one joint 46 for connecting control arm 42 to sub-frame 60 and that the lower control arm 42 may assume varying shapes and sizes.

The second side 42b of lower control arm 42 is pivotally attached to wheel assembly 24a. To attach the wheel assembly 24a to the second side 42b of lower control arm 42, a ball joint 50 may be provided. Other means for pivotally attaching the second side 42b of lower control arm 42 may also be employed, therefore, the language describing how lower control arm 42 is attached to wheel assembly 24a should not be viewed as limiting the scope of this invention.

While it is preferred that the upper control arm 40 form a single arm, upper control arm 40 may also be of a wishbone or other design. As shown in FIG. 2, upper control arm 40 has a first side 40a and a second side 40b. The first side 40a of upper control arm 40 is pivotally attached to a bracket 48 by joint 51. Similar to support member 70, bracket 48 may be formed as part of sub-frame 60 or exist separate and independently therefrom. As shown in FIGS. 2 and 3, for attachment to upper control arm 40, bracket 48 is preferably positioned in the middle of side wall 62. Although joint 51 is preferably a universal joint, it should be understood that other mechanisms may also be used to pivotally attach the first side 40a of upper control arm 40 to bracket 48, such as a shaft and bushing assembly or bearings. It should also be understood that there may be more than one combination of brackets 48 and joints 51 for connecting upper control arm 40 to sub-frame 60 and that upper control arm 40 may assume varying shapes and sizes.

The second side 40b of upper control arm 40 is pivotally attached to wheel assembly 24a. To attach the wheel assembly 24a to the second side 40b of lower control arm 42, a ball joint 55 may be provided. Other means for pivotally attaching the second side 40b of upper control arm 40 may also be employed, therefore, the language describing how lower control arm 40 is attached to wheel assembly 24a should not be viewed as limiting the scope of this invention.

For absorbing shocks and maintaining the height of the vehicle in response to elevational changes in the surface on which the vehicle rides, it is preferred that one spring unit 52 is provided for each wheel assembly 24a, 24b. It is also possible, however, to replace spring unit 52 with a gas shock or similar means for maintaining the position of wheel assemblies 24a, 24b with respect to the vehicle. Again, since the wheel assemblies 24a, 24b are minor images of each other, only the suspension components connecting wheel assembly 24a to the drive axle 18a will be described. A first end 52a of spring unit 52 may be pivotally attached to bracket 53 by a joint. Although joint is preferably a universal joint, it should be understood that other mechanisms may also be used to pivotally attach the first end 52a of spring unit 52 to bracket 53, such as a shaft and bushing assembly or bearings. To provide the necessary support for spring unit 52, bracket 53 may be attached to vehicle chassis. It should be appreciated, however, that bracket 53 may also be attached to sub-frame 60 or plate 34. It should also be appreciated that bracket 53 may also be formed as part of the sub-frame 60 or plate 34. A second end 52b of spring unit 52 may be pivotally attached to lower control arm 42 by a joint 56. Although joint 56 is preferably a universal joint, it should be understood that other mechanisms may also be used to pivotally attach the second end 52b of spring unit 52 to lower control arm 42, such as a shaft and bushing assembly or bearings.

Figure 5:
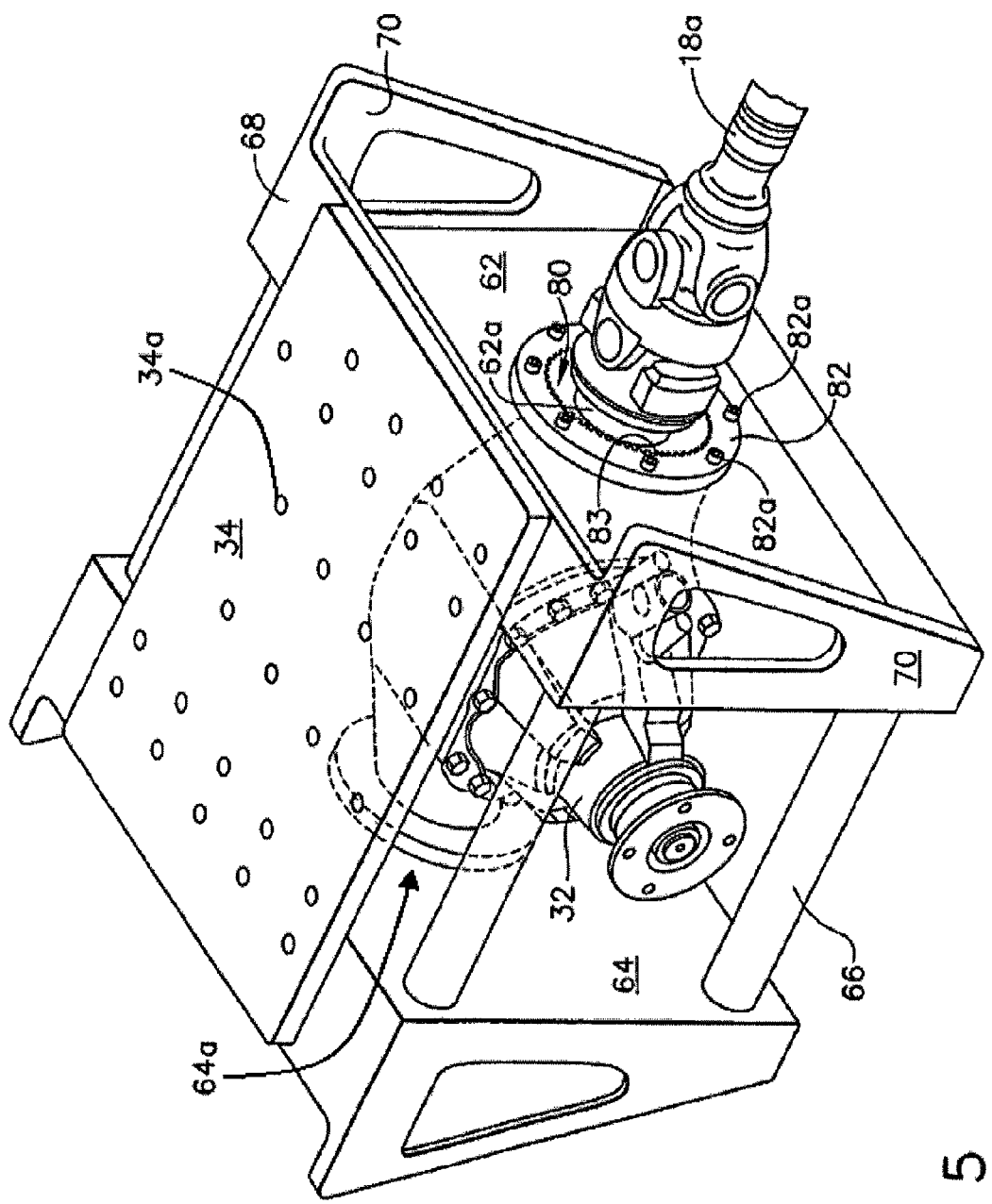
FIG. 5 illustrates an perspective view of a carrier housing associated with the drive axle shown in FIG. 1 with parts omitted for clarity, such as the upper and lower control arms and the wheel assembly.

Since it is common for drive shafts 16 to assume different angles with respect to the vehicle chassis, carrier housing 32 is designed to be attached to sub-frame 60 in various rotatable positions. More specifically, as shown in FIGS. 2 and 5, the coupling between carrier housing 32 and sub-frame 60 allows the carrier housing 32 to be rotated with respect to sub-frame 60 at varying angles. Although the present embodiment of the current invention allows for adjustments of the carrier housing 32 with respect to the sub-frame 60 of between 2.6 and 5.2 degrees, it should be understood that the degree of these adjustments is dependent on the size of splines formed on ring gear 82 and the spacing between bolts 82a attaching ring gear 82 to side wall 62, as described more fully below. Since the independent axles 18a, 18b are minor images of each other, only the coupling arrangement between the carrier housing 32 and the first side wall 62 of sub-frame 60 for independent axle 18a will be described. To allow carrier housing 32 to rotate with respect to sub-frame 60, carrier housing 32 includes a cover gear 80 that may be located within the aperture 62a in side wall 62 and that is designed to form a coupling engagement with ring gear 82, as described below. Moreover, the splines of cover gear 80 are designed to interface with the splines 83 of ring gear 82 to lock the carrier housing in place. Ring gear 82 is attached to side wall 62 of sub-frame 60 and may be located proximate to aperture 62a of side wall 62 to allow cover gear 80 to be coupled to ring gear 82. Although ring gear 82 is preferably attached to side wall 62 with bolts 82a, it should be understood that other attachments means may also be used and that ring gear 82 may be formed as an integral portion of the side wall 62.

To rotate carrier housing 32 with respect to sub-frame 60, cover gear 80 may be unsecured from carrier housing 32 and rotated, or the ring gear 82 may be unbolted from sub-frame 60 and rotated. Both of the foregoing options allow carrier housing 32 to be rotated with respect to sub-frame 60, however, the rotation of carrier housing 32 is limited by either the spacing between bolts 82a that attach ring gear 82 to sub-frame 60 or the size of the splines formed on cover gear 80 and ring gear 82.

For example, when cover gear 80 is removed from carrier housing 32, carrier housing 32 may then be rotated within aperture 62a of side wall 62. Once carrier housing 32 is rotated to the desired angular relationship (for example within 2.6 degrees) with respect to sub-frame 60, cover gear 80 may be inserted within aperture 62a and re-attached to carrier housing 32. Because there are only a limited number of bolts securing cover gear 80 to carrier housing 32, it should be apparent that carrier housing 32 may have to be rotated a few degrees in either direction in order to match up bolts with the holes (not shown) in cover gear 80. Once cover gear 80 is coupled to ring gear 82 and bolts are secured to carrier housing 32, carrier housing 32 will be locked in place and unable to rotate with respect to sub-frame 60.

By way of further example, when ring gear 82 is unbolted from sub-frame 60, carrier housing 32 and cover gear 80 may be rotated within aperture 62a. Once carrier housing 32 is rotated to the desired angular relationship (for example within 5.2 degrees) with respect to sub-frame 60, ring gear 82 may be re-attached to sub-frame 60 and thereby coupled to cover gear 80. Similar to the example describing adjustment of the cover gear 80, it should be apparent that the carrier housing 32 and ring gear 82 may have to be rotated a few degrees in either direction in order to match the splines 83 and bolts 82a with apertures (not shown) in sub-frame 60, prior to attaching ring gear 82 to sub-frame 60. Once bolts 82a are secured to sub-frame 60, ring gear 82 and cover gear 80 will be fixedly coupled to one another carrier housing 32 will be locked in place an unable to rotate with respect to sub-frame 60.

To reduce the speed of the vehicle or bring the vehicle to a stop, a braking system 100 may be provided. Several types of known braking systems may be used, including, but not limited to, dry disc brakes and wet disc brakes. Dry disc brakes for a single wheel may be further comprised of a disc 102 connected to an axle hub that drives the vehicle's wheel 106, two brake pads (not shown), and two pistons (not shown). One of the brake pads sit on each side of the rotating disc 102 and each piston sits adjacent to one of the brake pads on the side of the brake pad opposite the rotating disc 102. To actuate the brake pads, a brake force may be transmitted by hydraulic fluid forcing a piston to press against a respective brake pad. The brake pad then exerts a frictional force against the rotating disc 102 causing the disc 102 to decrease its rotational speed until it has stopped rotating. A wet disc brake system is comprised of similar components, but also includes a fluid contained within a brake housing that surrounds that rotating disc and brake pads. While the preferred embodiment of the present invention includes a wet or dry disc brake system, it should be evident to those with skill in the art that the present invention may use other braking systems without departing from the scope of this invention.

Although there has been no discussion of other aspects of the axle assembly, such as tie rods or sway bars it should be appreciated by those with skill in the art that these elements are well-known in the art and that many different designs for these elements exist and are likely to be compatible with the axle assembly described herein.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. An adjustable carrier housing for receiving a drive shaft that is drivingly coupled to a drive axle and attaching the drive shaft and drive axle to a vehicle chassis, comprising:

a sub-frame connected to the vehicle chassis, the sub-frame including a pair of side walls extending downward from the vehicle chassis and perpendicular to the drive axle, and each of the side walls including an aperture;

a pair of cover gears having a plurality of splines on the outside periphery thereof, where each of the cover gears is attached to an opposite sides of the carrier housing and positioned within the apertures located on the respective side walls;

a pair of ring gears, each ring gear positioned proximate to one of the apertures and coupled to the sub-frame and each ring gear having a plurality of splines on the inside of the ring gear for cooperating with the splines on the cover gears;

wherein the ring gears are coupled to the cover gears; and wherein the carrier housing is fixedly coupled to the sub-frame by the interlocking relationship between the splines on the cover gears and ring gears.

2. The adjustable carrier housing described in claim 1, wherein the ring gear is attached to the sub-frame by a plurality of bolts that are spaced apart at predetermined points around each of the respective apertures.

3. The adjustable carrier housing described in claim 2, wherein each of the predetermined points are separated by an angular relationship of 5.2 degrees with respect to the center of the aperture.

4. The adjustable carrier housing described in claim 1, wherein the carrier housing can be re-positioned with respect to the sub-frame to allow the drive shaft to form a different angle with respect to the sub-frame and chassis.

5. The adjustable carrier housing described in claim 4, wherein the carrier housing is re-positioned with respect to the sub-frame by removing the cover gear, rotating the carrier housing and then aligning and coupling the cover gear to the ring gear and carrier housing.

6. The adjustable carrier housing described in claim 5, wherein the cover gear may be re-positioned with respect to the sub-frame in 2.6 degree increments.

7. The adjustable carrier housing described in claim 4, wherein the carrier housing is re-positioned with respect to the sub-frame by removing the bolts attaching the ring gear to the sub-frame, rotating the ring gear and carrier housing to the desired position, and re-attaching the bolts and the ring gear to the sub-frame.

8. The adjustable carrier housing described in claim 7, wherein the ring gear may be re-positioned with respect to the sub-frame in 5.2 degree increments.

* * * * *